US007300542B2

(12) United States Patent  (10) Patent No.: US 7,300,542 B2
Thompson et al.  (45) Date of Patent: Nov. 27, 2007

(54) METHOD FOR INHIBITING CALCIUM SALT SCALE

(75) Inventors: Jacob Owen Thompson, St. Louis, MO (US); Sheldon Phillip Verrett, Olivette, MO (US); Jeremy E. Loy, Vernon Hills, IL (US); Steven John Severtson, Shoreview, MN (US)

(73) Assignee: Thermophos Trading GmbH, Zug (CH)

( * ) Notice: Subject to any disclaimer, the term of this patent is extended or adjusted under 35 U.S.C. 154(b) by 305 days.

(21) Appl. No.: 11/043,352

(22) Filed: Jan. 26, 2005

(65) Prior Publication Data

US 2005/0126727 A1   Jun. 16, 2005

Related U.S. Application Data

(62) Division of application No. 10/164,331, filed on Jun. 5, 2002, now Pat. No. 6,869,503.

(60) Provisional application No. 60/296,356, filed on Jun. 6, 2001.

(51) Int. Cl.
*D21C 9/00* (2006.01)
*D21C 11/00* (2006.01)
*C02F 5/14* (2006.01)

(52) U.S. Cl. ............... 162/80; 162/29; 162/30.11; 162/48; 252/175; 252/181

(58) Field of Classification Search ............... 162/29, 162/31, 32, 38, 48, 70, 80, 72, 76; 252/175, 252/180, 181; 210/700
See application file for complete search history.

(56) References Cited

U.S. PATENT DOCUMENTS

| 3,448,003 | A | 6/1969 | Merriman |
| 3,979,385 | A | 9/1976 | Wollmann et al. |
| 4,006,182 | A | 2/1977 | Plöger et al. |
| 4,631,131 | A | 12/1986 | Cuisia et al. |
| 4,735,787 | A | 4/1988 | Mouché et al. |
| 4,779,995 | A | 10/1988 | Santacaterina et al. |
| 4,799,995 | A | 1/1989 | Crump et al. |
| 4,851,082 | A | 7/1989 | Mita et al. |
| 4,851,490 | A | 7/1989 | Chen et al. |
| 4,872,996 | A | 10/1989 | Grierson et al. |
| 4,919,845 | A | 4/1990 | Vogt et al. |
| 5,002,126 | A | 3/1991 | Carlberg et al. |
| 5,087,376 | A | 2/1992 | Bendiksen et al. |
| 5,094,304 | A | 3/1992 | Briggs |
| 5,221,487 | A | 6/1993 | Carter |
| 5,261,491 | A | 11/1993 | Stewart et al. |
| 5,306,392 | A | 4/1994 | Mita |
| 5,320,757 | A | 6/1994 | Zidovec et al. |
| 5,358,640 | A | 10/1994 | Zeiher et al. |
| 5,433,886 | A | 7/1995 | Sherbondy et al. |
| 5,441,602 | A | 8/1995 | Harris et al. |
| 5,449,476 | A | 9/1995 | Sherbondy et al. |
| 5,490,942 | A | 2/1996 | Kuczynski |
| 5,534,157 | A | 7/1996 | Iman et al. |
| 5,552,018 | A | 9/1996 | Zevenyns |
| 5,560,862 | A | 10/1996 | Gosselink et al. |
| 5,562,830 | A | 10/1996 | Zidovec et al. |
| 5,580,462 | A | 12/1996 | Gill |
| 5,635,104 | A | 6/1997 | Kott et al. |
| 5,658,464 | A * | 8/1997 | Hann et al. ............... 210/697 |
| 5,709,814 | A | 1/1998 | Gill |
| 5,772,913 | A | 6/1998 | Gill et al. |
| 5,788,857 | A | 8/1998 | Yang et al. |
| 6,063,290 | A * | 5/2000 | Failon et al. ............... 210/699 |
| 6,123,869 | A | 9/2000 | Lawson et al. |
| 6,210,600 | B1 | 4/2001 | Zhou et al. |
| 6,333,005 | B1 * | 12/2001 | Nguyen ....................... 422/13 |
| 6,355,214 | B1 * | 3/2002 | Fader et al. ................. 422/13 |
| 6,365,101 | B1 * | 4/2002 | Nguyen et al. .............. 422/13 |
| 6,391,207 | B1 * | 5/2002 | Cluyse ....................... 210/700 |
| 6,572,789 | B1 * | 6/2003 | Yang et al. ............ 252/389.23 |
| 6,641,754 | B2 | 11/2003 | Buentello et al. |
| 7,172,677 | B2 * | 2/2007 | Thompson et al. .......... 162/80 |
| 2002/0094299 | A1 | 7/2002 | Nguyen et al. |
| 2003/0010458 | A1 | 1/2003 | Thompson et al. |
| 2003/0075290 | A1 | 4/2003 | Thompson et al. |

FOREIGN PATENT DOCUMENTS

| CA | 1069800 | 1/1980 |
| DE | 3537808 A | 4/1987 |
| DE | 19857251 A1 | 6/2000 |
| EP | 0291869 | 5/1988 |
| EP | 0492064 | 7/1992 |
| EP | 0711733 B1 | 8/1999 |
| WO | WO 02/098803 A1 | 12/2002 |

OTHER PUBLICATIONS

Windhager, R. H.; An Effective Sequestrant for Use in Controlling Digester Scale; Paper Trade Journal; pp. 42-44; Nov. 5, 1973.

* cited by examiner

*Primary Examiner*—José A. Fortuna
(74) *Attorney, Agent, or Firm*—Blackwell Sanders, LLP

(57) ABSTRACT

Compositions and method of improving inhibition of calcium salt scale formation under the conditions found in chemical pulp processes in which an effective amount of selected phosphonates or phosphonate blends is admixed with the black liquor composition recovered from the digester in a chemical pulping process. The compositions and method are especially well suited for use in the Kraft pulping process.

44 Claims, No Drawings

METHOD FOR INHIBITING CALCIUM SALT SCALE

CROSS-REFERENCE TO RELATED APPLICATIONS

This application is a divisional application of U.S. patent application Ser. No. 10/164,331, filed Jun. 5, 2002, now U.S. Pat. No. 6,869,503; which claims the priority of prior provisional application Ser. No. 60/296,356, entitled "Method for Inhibiting Calcium Salt Scale," filed Jun. 6, 2001, which is hereby incorporated by reference into this application.

FIELD OF THE INVENTION

This invention relates to compositions and methods for inhibiting scale formation in aqueous alkaline systems of chemical pulping processes. This invention further relates to compositions and methods for inhibiting formation, deposition and adherence of calcium salt scale deposits in chemical pulping process equipment. More particularly, this inventions relates to compositions and methods for inhibiting formation, deposition and adherence of calcium salt scale deposits in the black liquor recovery area of a chemical pulping process.

BACKGROUND OF THE INVENTION

Paper is widely used worldwide in commerce and in homes and has a variety of uses. Pulp making is thus carried out on a large industrial scale worldwide to produce sufficient quantities of paper. Accordingly it is highly desirable that such pulp making operations be carried out in a cost effective, efficient operation with minimum manufacturing equipment downtime and minimum periods of reduced pulp making process equipment efficiency.

The basic steps in industrial pulp making are to convert plant fiber into chips, convert chips into pulp, (optionally) bleach the pulp, wash the pulp, and transform the pulp into suitable paper which can be used in paper products such as writing paper, newsprint and paper for documents.

Typically, several chemical pulping processes are used in industrial pulp making operations. Well known industrial alkaline chemical pulping processes include the Kraft (or sulfate), soda and alkaline sulfite processes. The Kraft process makes the strongest fibers of any pulp producing process and is the most commonly used pulp making process in part due to its efficient recovery process for the cooking chemicals. While the present invention has applicability to any of the above alkaline chemical pulping processes, it is particularly useful with the Kraft process and, as such, the Kraft process is described in more detail below.

Initially, suitable trees are harvested, debarked and then chipped into suitable size flakes or chips. These wood chips are sorted with the small and the large chips being removed. The remaining suitable wood chips are then charged to a digester (which is a vessel or tank for holding the chips and an aqueous digesting composition, such tanks can be designed for either batch or continuous operation).

Illustratively, in a batch type digester, wood chips and a mixture of "weak black liquor," the spent liquor from a previous digester cook, and "white liquor," a solution of sodium hydroxide and sodium sulfide, that is either fresh or from the chemical recovery plant, is pumped into the digester. In the cooking process lignin, which binds the wood fiber together, is dissolved in the white liquor forming pulp and black liquor.

The digester is sealed and the digester composition is heated to a suitable cook temperature under high pressure. After an allotted cooking time at a particular temperature and pressure (H-factor) in the digester, the digester contents (pulp and black liquor) are transferred to a holding tank. The pulp in the holding tank is transferred to brown stock washers while the liquid (black liquor formed in the digester) is sent to the black liquor recovery area, i.e. black liquor evaporators. The black liquor is evaporated to a high solids content, usually 60-80% solids, using a multiple effect evaporator, for example. The higher the solids content, the more difficult it is to pump the black liquor and the more scale problems the pulp mill will have. One of the most troublesome is calcium carbonate scale which forms in various areas of the pulp mill, including the digester, the black liquor evaporator area, and the brown stock washing area.

Most commercial paper mills use multiple effect evaporators (MEE) as the black liquor evaporators. These evaporators generally range from four to eight effects in length. Generally, undesirable calcium carbonate scaling occurs in only one or two effects. Currently, most mills do not use any scale inhibitor but rather contend with the scale problem by shutting down the black liquor evaporator section and washing out the calcium carbonate scale with hot acid, i.e. acid cleaning. This hot acid boil out adversely affects papermill production and is a concern because the acid used is corrosive to mill piping and equipment.

The Kraft cook is highly alkaline, usually having a pH of 10 to 14, more particularly. 12 to 14. The digester composition contains a large amount of sodium sulfide, which is used as an accelerant to increase the delignification rate of the cook. This works to release the lignin in the wood chips and thus the cellulose becomes available as pulp.

The combination of operating conditions in the Kraft process is conducive to scale formation and deposition and increases the propensity of the calcium carbonate scale to form, deposit and adhere to metallic and other surfaces within which it comes in contact. Under such process conditions, calcium present in the water and leached from the wood in the Kraft process can react with carbonate and produce rather rapid scaling with the deposition of calcium carbonate scale. Such scale is frequently deposited in the black liquor evaporator, the digester, and associated piping, heat exchangers, etc., all of which have surfaces on which the calcium carbonate can deposit and adhere. Such deposition builds up over time and can result in undesirable premature shutdowns downstream on the pulp making manufacturing line to remove scale deposits by hot acid washing.

Several patents and a technical article disclose problems of scaling. In "An Effective Sequestrant For Use In Controlling Digester Scale," R. H. Windhager, Paper Trade Journal, pp. 42-44, Nov. 5, 1973, the use of small quantities of mono-aminomethylene phosphonic acid (ATMP) as a calcium carbonate scale inhibitor in a digester to inhibit scale deposition from the digester cooking liquor is disclosed.

U.S. Pat. No. 4,799,995 (issued to Druce K. Crump et al. on Jan. 24, 1989) discloses that inhibition of calcium scale under conditions found in pulp digesters has been accomplished by employing mixtures of polyamino(polyalkylenephosphonic) acids with non-ionic surfactants added to the pulp liquor. This U.S. patent also discloses that phosphonates such as nitrilotris(methylenephosphonic acid) ("NTMP" or "ATMP"), 1-hydroxyethane-1,1-diphosphonic acid ("HEDP") and sodium 1-hydroxyethane-1,1-diphosphonate ("NaHEDP") are said to have been commonly used to control scale. However, the '995 patent discloses that the use of HEDP in black liquor actually promoted scale and use of diethylenetriamine penta(methylenephosphonic acid) ("DTPMP") in black liquor without the presence of a nonionic surfactant resulted in only limited scale reduction. While the '995 patent discloses the use of nonionic surfactants to improve scale reduction, it is preferred to avoid the use of surfactants in chemical pulp processes, particularly in the digester. The compositions of the present invention when added to an alkaline chemical pulp process digester are effective at inhibiting calcium salt scale in chemical pulp processes without the need for a nonionic surfactant.

Canadian Patent No. 1,069,800 (Philip S. Davis et al., Jan. 15, 1980) discloses the addition of blends of organophosphonates, e.g. 1-hydroxyethylidene-1,1-diphosphonic acid (HEDP), with amino-organo phosphonates, e.g. amino tri (methylenephosphonic acid) (AMP), ethylenediamine tetra (methylenephosphonic acid) (EDTPA), and hexamethylenediamine tetra(methylenephosphonic acid) (HMDTA), to black liquor to reduce calcium carbonate scale in a black liquor evaporator system at a pH above 9. This patent also discloses that use of individual (single) phosphonates, instead of the disclosed blends, were not effective at a pH above 9 to inhibit calcium carbonate crystallization.

U.S. Pat. No. 4,851,490 (issued to Fu Chen et al. on Jul. 25, 1989) discloses water soluble polymers containing hydroxyalkyleneaminoalkylene phosphonate functions which are said to have utility as deposit control agents effective in a number of water systems such as cooling, boilers, conversion coating, paper and pulp processing and gas scrubbing.

U.S. Pat. No. 5,534,157 (issued to Craig D. Iman et al. on Jul. 9, 1996) discloses a method for inhibiting the formation, deposition and adherency of scale-forming salts in process waters at high pH utilizing polyether polyamine methylene phosphonates. At column 4, lines 35-51 thereof, this U.S. patent discloses that inhibitors such as HEDP and ATMP are useless as scale inhibitors at alkaline pH conditions.

U.S. Pat. No. 5,562,830 (issued to Davor F. Zidovec et al. on Oct. 8, 1996) discloses a method of inhibiting corrosion and scale formation and deposition in aqueous systems by adding a combination of a polyepoxysuccinic acid or salts thereof and a phosphonocarboxylic acid or salts thereof.

U.S. Pat. No. 5,552,018 (issued to Johan Devenyns on Sep. 3, 1996) discloses a process in which a peroxyacid is employed to improve the selectivity of the delignification of a chemical paper pulp that has already undergone a delignifying treatment in the presence of chemical reagents, i.e. a Kraft cook. Phosphonates are disclosed as stabilizers in this process.

Despite the aforementioned patents and technical article, enhanced methods and compositions for inhibiting the formation, deposition and adherence of scale to metallic surfaces particularly in commercial chemical pulp processing equipment is highly desired.

SUMMARY OF THE INVENTION

It is an object of this invention to provide a composition for inhibiting the formation, deposition and adherence of calcium salt scale to metallic and other surfaces in the equipment, vessels and/or piping of a chemical pulp process facility. It is another object of this invention to provide a method for inhibiting the formation, deposition and adherence of calcium salt scale to surfaces in the equipment, vessels and/or piping of a chemical pulp process facility.

These and other objects are achieved in the invention which is described in more nonlimiting detail hereinafter.

According to the invention, a scale inhibiting composition for inhibiting calcium salt scale formation in alkaline aqueous mixtures of chemical pulping processes is provided, wherein the composition is added to the black liquor of the chemical pulping process, the composition comprising an effective scale inhibiting amount of at least one phosphonate selected from compounds having the formula:

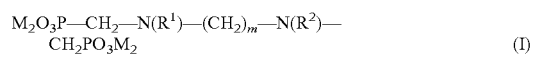

compounds having the formula:

compounds having the formula:

$N—(CH_2PO_3M_2)_3$ (III), phosphonates having the formula:

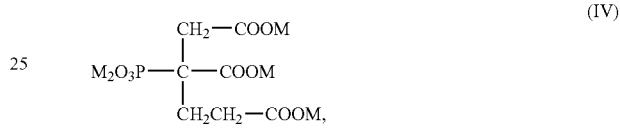

amine oxides of phosphonates of formulas (I) and (III), or mixtures thereof; wherein M is independently selected from hydrogen, alkali metal, alkaline earth metal or ammonium, $R^1$ and $R^2$ are independently selected from $CH_2PO_3M_2$ or $(CH_2)_n$—N—$(CH_2PO_3M_2)_2$, m is 2 or 3, n is 2 or 3, and $R^3$ is an alkyl group having 1 to 17 carbon atoms and $R^3$ is optionally branched and optionally unsaturated; with the provisos that:

(a) the phosphonate is not a blend of a phosphonate of formula (II) with a phosphonate of formula (III), (b) the phosphonate is not a blend of a phosphonate of formula (II) with a phosphonate of the formula $(M_2O_3P—CH_2)_2—N—(CH_2)_2—N—(CH_2PO_3M_2)_2$, (c) when the phosphonate is selected from phosphonates of formula (III), phosphonates of the formula $(M_2O_3P—CH_2)_2—N—(CH_2)_2—N—(CH_2PO_3M_2)_2$, or phosphonates of the formula $(M_2O_3P—CH_2)_2—N—(CH_2)_2—N—(CH_2PO_3M_2)—(CH_2)_2—N—(CH_2PO_3M_2)_2$, the scale inhibiting composition does not contain a nonionic surfactant, (d) when the phosphonate is selected from phosphonates of formula (III), or phosphonates of the formula $(M_2O_3P—CH_2)_2—N—(CH_2)_2—N—(CH_2PO_3M_2)—(CH_2)_2—N—(CH_2PO_3M_2)_2$, the amount of the phosphonate on an active acid basis is greater than 25 ppm based on the weight of black liquor recovered from the digester, and (e) when the phosphonate is selected from the phosphonates of formula (IV), the amount of the phosphonate on an active acid basis is greater than 20 ppm based on the weight of black liquor recovered from the digester.

Further according to the invention, a method for inhibiting calcium salt scale formation in chemical pulping processes is provided comprising admixing an effective inhibiting amount of the above composition with the black liquor recovered from the digester of the chemical pulping process.

Still further according to the invention, a method for inhibiting calcium salt scale formation in an aqueous system in a selected alkaline chemical pulping process is provided comprising: (a) determining the calcium salt scale inhibition profiles of phosphonate concentration and process temperature as a function of time for phosphonate compositions admixed with the black liquor composition recovered from the digester of the chemical pulping process, (b) identifying the calcium salt scale inhibition capability required by the selected chemical pulping process based on the process operating conditions of time, temperature and pressure, and the black liquor composition, (c) selecting the appropriate phosphonate composition and phosphonate use concentration to effectively inhibit calcium salt scale formation in the selected chemical pulping process when the phosphonate is admixed with the black liquor composition recovered from the digester of the selected alkaline chemical pulping process based on steps (a) and (b), and (d) admixing the selected phosphonate composition with the black liquor composition in the selected alkaline chemical pulping process during the black liquor recovery stage of the chemical pulping process; wherein the selected phosphonate composition is as defined above.

Still further according to the invention, a method for inhibiting calcium salt scale formation in an aqueous system in a selected alkaline chemical pulping process is provided comprising: (a) identifying the calcium salt scale inhibition capability required by the selected chemical pulping process based on the process operating conditions of time, temperature and pressure, and the black liquor composition, (b) selecting the appropriate phosphonate composition and phosphonate use concentration to effectively inhibit calcium salt scale formation in the selected alkaline chemical pulping process when the phosphonate is admixed with the black liquor composition recovered from the digester in the selected alkaline chemical pulping process based on step (a) and the calcium salt scale inhibition profiles of phosphonate concentration and process temperature as a function of time for phosphonate compositions admixed with the black liquor composition recovered from the digester in a chemical pulping process, and (c) admixing the selected phosphonate composition with the black liquor composition recovered from the digester in the selected alkaline chemical pulping process during the digestion stage of the chemical pulping process; wherein the selected phosphonate composition is as defined above.

DETAILED DESCRIPTION OF THE DRAWINGS

Not Applicable.

DETAILED DESCRIPTION OF THE INVENTION

A first embodiment of the invention relates to a scale inhibiting composition for inhibiting calcium salt-scale formation in alkaline aqueous mixtures of chemical pulping processes, wherein the composition is added to the black liquor of the chemical pulping process, the composition comprising an effective scale inhibiting amount of at least one phosphonate selected from compounds having the formula:

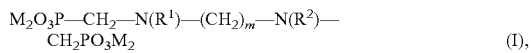

(I), compounds having the formula:

(II), compounds having the formula:

(III), phosphonates having the formula:

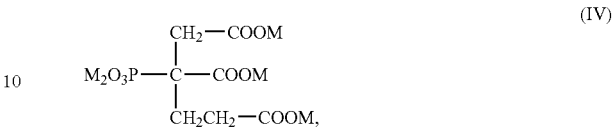

(IV)

amine oxides of phosphonates of formulas (I) and (III), or mixtures thereof; wherein M is independently selected from hydrogen, alkali metal, alkaline earth metal or ammonium, $R^1$ and $R^2$ can be the same or different and are independently selected from $-CH_2PO_3M_2$ or $-(CH_2)_n-N-(CH_2PO_3M_2)_2$, m is 2 or 3, n is 2 or 3, and $R^3$ is an alkyl group having 1 to 17 carbon atoms and $R^3$ is optionally branched and optionally unsaturated; with the provisos that:

(a) the phosphonate is not a blend of a phosphonate of formula (II) with a phosphonate of formula (III), (b) the phosphonate is not a blend of a phosphonate of formula (II) with a phosphonate of the formula $(M_2O_3P-CH_2)_2-N-(CH_2)_2-N-(CH_2PO_3M_2)_2$, (c) when the phosphonate is selected from phosphonates of formula (III), phosphonates of the formula $(M_2O_3P-CH_2)_2-N-(CH_2)_2-N-(CH_2PO_3M_2)_2$, or phosphonates of the formula $(M_2O_3P-CH_2)_2-N-(CH_2)_2-N-(CH_2PO_3M_2)-(CH_2)_2-N-(CH_2PO_3M_2)_2$, the scale inhibiting composition does not contain a nonionic surfactant, (d) when the phosphonate is selected from phosphonates of formula (III), or phosphonates of the formula $(M_2O_3P-CH_2)_2-N-(CH_2)_2-N-(CH_2PO_3M_2)-(CH_2)_2-N-(CH_2PO_3M_2)_2$, the amount of the phosphonate on an active acid basis is greater than 25 ppm based on the weight of black liquor recovered from the digester, and (e) when the phosphonate is selected from the phosphonates of formula (IV), the amount of the phosphonate on an active acid basis is greater than 20 ppm based on the weight of black liquor recovered from the digester.

In the phosphonates of the invention, M is preferably hydrogen or alkali metal, and the alkali metal is preferably sodium or potassium, $R^3$ is preferably an alkyl group having 1 to 5 carbon atoms, more preferably methyl, and m is preferably 2.

The scale inhibiting compositions of the invention include, but are not limited to, at least one phosphonate of formula (I), at least one phosphonate of formula (II), at least one phosphonate of formula (III), at least one phosphonate of formula (IV), at least one amine oxide of a phosphonate of formulas (I) or (III), a mixture of at least two phosphonates of formula (I), a mixture of at least one phosphonate of formula (I) and at least one phosphonate of formula (II), formula (III) or formula (IV), a mixture of at least two phosphonates of formula (II), or a mixture of at least one amine oxide of a phosphonate of formulas (I) or (III) and at least one phosphonate of formulas (I) or (III). Preferably, the scale inhibiting composition of the invention is at least one phosphonate of formula (I), a mixture of at least two phosphonates of formula (I), a mixture of at least one phosphonate of formula (I) and at least one phosphonate of formula (II) or formula (III), or a mixture of at least one phosphonate of formula (II) and at least one phosphonate of formula (IV).

Examples of suitable phosphonates include, but are not limited to, the phosphonates in Table 1 below. Table 1 below provides formulas for representative phosphonates of formulas (I), (II) and (III). The phosphonates in Table 1 are available from Solutia Inc., 575 Maryville Centre Drive, St. Louis, Mo. under the trademark Dequest® phosphonates and are identified by their Dequest® phosphonate product number.

TABLE 1

| Dequest Product No. | Formula | $R^1$ | $R^2$ | m | n | $R^3$ | M |
|---|---|---|---|---|---|---|---|
| 2000 | III | — | — | — | — | — | 6 H |
| 2006 | III | — | — | — | — | — | 5 Na, 1 H |
| 2010 | II | — | — | — | — | $CH_3$ | 4 H |
| 2016 | II | — | — | — | — | $CH_3$ | 4 Na |
| 2041 | I | $CH_2PO_3M_2$ | $CH_2PO_3M_2$ | 2 | — | — | 8 H |
| 2046 | I | $CH_2PO_3M_2$ | $CH_2PO_3M_2$ | 2 | — | — | 3 H, 5 Na |
| 2060 | I | $CH_2PO_3M_2$ | $(CH_2)_nN(CH_2PO_3M_2)_2$ | 2 | 2 | — | 10 H |
| 2066 | I | $CH_2PO_3M_2$ | $(CH_2)_nN(CH_2PO_3M_2)_2$ | 2 | 2 | — | 7 Na, 3 H |
| 7000 | IV | — | — | — | — | — | 5 H |

The formulas and corresponding names of the Dequest phosphonates listed in Table 1 are shown below.

Dequest 2000—amino-tris(methylenephospohonic acid)
    $N(CH_2PO_3H_2)_3$

Dequest 2006—sodium salt of amino-tris(methylenephosphonic acid)
    $Na_5H[N(CH_2PO_3)_3]$ Dequest 2010—1-hydroxyethylidene(1,1-diphosphonic acid)
    $CH3C(OH)(PO_3H_2)_2$ Dequest 2016—sodium salt of 1-hydroxyethylidene(1,1-diphosphonic acid)
    $Na_4[CH_3C(OH)(PO_3)_2]$ Dequest 2041—ethylenediamine tetra(methylenephosphonic acid)
    $H_8[(O_3PCH_2)_2NCH_2CH_2N(CH_2PO_3)_2]$ Dequest 2046—ethylenediamine tetra(methylenephosphonic acid), pentasodium salt
    $Na_5H_3[(O_3PCH_2)_2NCH_2CH_2N(CH_2PO_3)_2]$ Dequest 2060—diethylenetriamine-penta(methylenephosphonic acid)
    $(H_2O_3PCH_2)_2NCH_2CH_2N(CH_2PO_3H_2)CH_2CH_2N(CH_2PO_3H_2)_2$ Dequest 2066—sodium salt of diethylenetriamine-penta (methylenephosphonic acid)
    $Na_7H_3[(O_3PCH_2)_2NCH_2CH_2N(CH_2PO_3)CH_2CH_2N(CH_2PO_3)_2]$ Dequest 7000—2-phosphonobutane-1,2,4-tricarboxylic acid

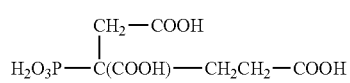

Another preferred phosphonate of formula (I) is the compound N,N'-bis(3-aminopropyl)ethylenediamine-hexa (methylenephosphonic acid), or a salt thereof wherein the salt is sodium, potassium, ammonium, and the like. When the compound is the sodium salt, the compound has the formula $Na_xH_y[(O_3PCH_2)_2NCH_2CH_2CH_2N(CH_2PO_3)CH_2CH_2N(CH_2PO_3)CH_2CH_2CH_2N—(CH_2PO_3)_2]$; wherein x+y is 12, and is designated herein as 4NHMP. This compound can be prepared according to the procedure disclosed in Example 1 of U.S. Pat. No. 5,261,491, which is herein incorporated by reference.

The preferred phosphonates of formula (I) are $(M_2O_3PCH_2)_2NCH_2CH_2N(CH_2PO_3M_2)_2$, $(M_2O_3PCH_2)_2NCH_2CH_2N(CH_2PO_3M_2)CH_2CH_2N(CH_2PO_3M_2)_2$1 or $(M_2O_3PCH_2)_2NCH_2CH_2CH_2N(CH_2PO_3M_2)CH_2CH_2N(CH_2PO_3M_2)CH_2CH_2CH_2N—(CH_2PO_3M_2)_2$, more preferably $(M_2O_3PCH_2)_2NCH_2CH_2N(CH_2PO_3M_2)_2$ or $(M_2O_3PCH_2)_2NCH_2CH_2N(CH_2PO_3M_2)CH_2CH_2N(CH_2PO_3M_2)CH_2CH_2CH_2N—(CH_2PO_3M_2)_2$, and most preferably $(M_2O_3PCH_2)_2NCH_2CH_2CH_2N(CH_2PO_3M_2)CH_2CH_2N(CH_2PO_3M_2)CH_2CH_2CH_2N—(CH_2PO_3M_2)_2$.

The preferred phosphonate of formula (II) is $H_3C—C(OH)(PO_3M_2)_2$, with $H_3C—C(OH)(PO_3Na_2)_2$ being more preferred.

Blends of at least two phosphonates independently selected from the phosphonates of formulas (I), (II), (III), (IV) and amine oxides of the phosphonates of formulas (I) and (III) may be used according to the invention. It is currently preferred to use a blend of two phosphonates, with a blend of a phosphonate of formula (I) with either a phosphonate of formula (I), formula (II), formula (III) or formula (IV) being more preferred, and a blend of two phosphonates of formula (I) being most preferred. The composition of the blends can vary over a wide range with the percentage of each component ranging broadly from 1 to 99 wt. %, provided each phosphonate is present in an amount of at least about 1 wt. %. Preferably, each phosphonate is present in an amount of at least about 10 wt. %. In the case of a two component blend, each phosphonate is present preferably in an amount of about 10 to about 90 wt. %, and more preferably in an amount of about 20 to about 80 wt. %.

The preferred blends for use in the invention are blends of a phosphonate selected from N,N'-bis(3-aminopropyl)ethylenediamine-hexa(methylenephosphonic acid), diethylenetriamine-penta(methylenephosphonic acid), or salts thereof with a phosphonate selected from the phosphonates of formulas (I), (II), (III) or (IV), or a phosphonate selected from ethylenediamine tetra(methylenephosphonic acid), or salts thereof with a phosphonate selected from the phosphonates of formulas (I) or (III). More preferred are blends of phosphonates selected from N,N'-bis(3-aminopropyl)ethylenediamine-hexa(methylenephosphonic acid), ethylenediamine tetra(methylenephosphonic acid), diethylenetriamine-penta(methylenephosphonic acid), or salts thereof with another phosphonate selected from the phosphonates of formula (I) and blends of N,N'-bis(3-aminopropyl)ethylenediamine-hexa(methylenephosphonic acid), diethylenetriamine-penta(methylenephosphonic acid) or salts thereof with a phosphonate selected from the phosphonates of formula (II).

An effective amount of phosphonate or mixtures of phosphonates is employed in making and using the scale inhibiting composition of this invention. That effective amount depends on the particular phosphonate(s) employed in practicing this invention and other factors including, but not limited to, the digester composition, the operating conditions (i.e. H-factor) of the digester, the black liquor composition, and operating conditions in the brown stock washing area and black liquor recovery area, as well as other factors and conditions known to those of ordinary skill in the art. Selection of the effective amount of phosphonate will be readily apparent to one of ordinary skill in the art after reading this specification.

When the scale inhibiting composition of the invention is at least one phosphonate of formula (I), the phosphonate(s) and the effective scale inhibiting amount of each is as follows.

As used herein, the ppm usage level of scale inhibitor is based on the weight of total liquor charged with the liquor assumed to have a density of 1 g/mL.

When the phosphonate is $(M_2O_3PCH_2)_2NCH_2CH_2N(CH_2PO_3M_2)_2$, the effective amount of the phosphonate on an active acid basis is about 10 ppm to about 1000 ppm, preferably about 20 ppm to about 500 ppm, and more preferably about 30 to about 500 ppm, based on the weight of black liquor recovered from the digester.

When the phosphonate is $(M_2O_3PCH_2)_2NCH_2CH_2N(CH_2PO_3M_2)CH_2CH_2N(CH_2PO_3M_2)_2$, the effective amount of phosphonate on an active acid basis is about 30 ppm to about 1000 ppm, preferably about 40 ppm to about 500 ppm, based on the weight of black liquor recovered from the digester.

When the phosphonate is $(M_2O_3PCH_2)_2NCH_2CH_2CH_2N(CH_2PO_3M_2)CH_2CH_2N(CH_2PO_3M_2)CH_2CH_2CH_2N-(CH_2PO_3M_2)_2$, the effective amount of phosphonate on an active acid basis is about 10 ppm to about 1000 ppm, preferably about 20 ppm to about 500 ppm, based on the weight of black liquor recovered from the digester.

When the scale inhibiting composition of the invention is at least one phosphonate of formula (III), the phosphonate is preferably $CH_3C(OH)(PO_3M_2)_2$ and the effective scale inhibiting amount of phosphonate on an active acid basis is about 20 ppm to about 200 ppm, preferably about 30 ppm to about 100 ppm, based on the weight of black liquor recovered from the digester.

When the scale inhibiting composition of the invention is at least one phosphonate of formula (III), the effective scale inhibiting amount of phosphonate on an active acid basis is about 50 to about 1000 ppm, preferably about 80 to about 500 ppm, based on the weight of black liquor recovered from the digester.

When the scale inhibiting composition of the invention is at least one phosphonate of formula (IV), the effective scale inhibiting amount of phosphonate on an active acid basis is about 50 to about 500 ppm, preferably about 100 to about 200 ppm, based on the weight of black liquor recovered from the digester.

When the scale inhibiting composition of the invention is at least one amine oxide of a phosphonate of formula (I) or formula (III), the effective scale inhibiting amount of amine oxide is the amount on an active acid basis that is equivalent to the effective amount of the corresponding phosphonate of formula (I) or formula (III).

When the scale inhibiting composition of the invention is a mixture of at least two phosphonates of formula (I) or a mixture of at least one phosphonate of formula (I) and at least one phosphonate of formula (III), the phosphonate(s) and the effective scale inhibiting amount of each is as follows.

When the first phosphonate is $(M_2O_3PCH_2)_2NCH_2CH_2CH_2N(CH_2PO_3M_2)CH_2CH_2N(CH_2PO_3M_2)CH_2CH_2CH_2—N(CH_2PO_3M_2)_2$, the second phosphonate is preferably selected from $N(CH_2PO_3M_2)_3$, $(M_2O_3PCH_2)_2NCH_2CH_2N(CH_2PO_3M_2)_2$, or $(M_2O_3PCH_2)_2NCH_2CH_2N(CH_2PO_3M_2)CH_2CH_2N(CH_2PO_3M_2)_2$. When the second phosphonate is $N(CH_2PO_3M_2)_3$, the amount of the mixture on an active acid basis is about 10 ppm to about 1000 ppm, preferably about 200 ppm to about 500 ppm, based on the weight of black liquor recovered from the digester. When the second phosphonate is $(M_2O_3PCH_2)_2NCH_2CH_2N(CH_2PO_3M_2)_2$, the amount of the mixture on an active acid basis is about 20 ppm to about 1000 ppm, preferably about 30 ppm to about 500 ppm, based on the weight of black liquor recovered from the digester. When the second phosphonate is $(M_2O_3PCH_2)_2NCH_2CH_2N(CH_2PO_3M_2)CH_2CH_2N(CH_2PO_3M_2)_2$, the amount of the mixture on an active acid basis is about 10 ppm to about 1000 ppm, preferably about 30 ppm to about 500 ppm, based on the weight of black liquor recovered from the digester.

When the first phosphonate is $(M_2O_3PCH_2)_2NCH_2CH_2N(CH_2PO_3M_2)_2$, the second phosphonate is preferably selected from $(M_2O_3PCH_2)_2NCH_2CH_2N(CH_2PO_3M_2)CH_2CH_2N(CH_2PO_3M_2)_2$ or $N(CH_2PO_3M_2)_3$. When the second phosphonate is $(M_2O_3PCH_2)_2NCH_2CH_2N(CH_2PO_3M_2)CH_2CH_2N(CH_2PO_3M_2)_2$, the amount of the mixture on an active acid basis is about 20 ppm to about 1000 ppm, preferably about 40 ppm to about 500 ppm, based on the weight of black liquor recovered from the digester. When the second phosphonate is $N(CH_2PO_3M_2)_3$, the amount of the mixture on an active acid basis is about 30 ppm to about 1000 ppm, preferably about 50 ppm to about 500 ppm, based on the weight of black liquor recovered from the digester.

When the first phosphonate is $(M_2O_3PCH_2)_2NCH_2CH_2N(CH_2PO_3M_2)CH_2CH_2N(CH_2PO_3M_2)_2$, and the second phosphonate is $N(CH_2PO_3M_2)_3$, the amount of the mixture on an active acid basis is about 50 ppm to about 1000 ppm, preferably about 150 ppm to about 500 ppm, based on the weight of black liquor recovered from the digester.

The preferred blends of at least two phosphonates of formula (I) or at least one phosphonate of formula (I) and at least one phosphonate of formula (III) are blends of $(M_2O_3PCH_2)_2NCH_2CH_2CH_2N(CH_2PO_3M_2)CH_2CH_2N(CH_2PO_3M_2)CH_2CH_2CH_2—N(CH_2PO_3M_2)_2$ with $N(CH_2PO_3M_2)_3$, $(M_2O_3PCH_2)_2NCH_2CH_2N(CH_2PO_3M_2)_2$, or $(M_2O_3PCH_2)_2NCH_2CH_2N(CH_2PO_3M_2)CH_2CH_2N(CH_2PO_3M_2)_2$, or blends of $(M_2O_3PCH_2)_2NCH_2CH_2N(CH_2PO_3M_2)_2$ with $(M_2O_3PCH_2)_2NCH_2CH_2N(CH_2PO_3M_2)CH_2CH_2N(CH_2PO_3M_2)CH_2CH_2CH_2—(CH_2PO_3M_2)_2$, $(M_2O_3PCH_2)_2NCH_2CH_2N(CH_2PO_3M_2)CH_2CH_2N(CH_2PO_3M_2)_2$, or $N(CH_2PO_3M_2)_3$.

The most preferred blends of at least two phosphonates of formula (I) or at least one phosphonate of formula (I) and at least one phosphonate of formula (III) are blends of $(M_2O_3PCH_2)_2NCH_2CH_2CH_2N(CH_2PO_3M_2)CH_2CH_2N$ $(CH_2PO_3M_2)$—$CH_2CH_2CH_2N(CH_2PO_3M_2)_2$ with $N(CH_2PO_3M_2)_3$, $(M_2O_3PCH_2)_2NCH_2CH_2N(CH_2PO_3M_2)_2$, or $(M_2O_3PCH_2)_2NCH_2CH_2N(CH_2PO_3M_2)CH_2CH_2N(CH_2PO_3M_2)_2$.

When the scale inhibiting composition of the invention is a mixture of at least one phosphonate of formula (I) and at least one phosphonate of formula (II), the phosphonate(s) and the effective scale inhibiting amount of each is as follows.

Preferred blends are mixtures of a first phosphonate selected from $(M_2O_3PCH_2)_2NCH2CH_2CH_2N(CH_2PO_3M_2)CH_2CH_2N(CH_2PO_3M_2)CH_2CH_2CH_2N$—$(CH_2PO_3M_2)_2$ or $(M_2O_3PCH_2)_2NCH_2CH_2N(CH_2PO_3M_2)CH_2CH_2N(CH_2PO_3M_2)_2$, and a second phosphonate selected from $CH_3C(OH)(PO_3M_2)_2$.

When the first phosphonate is selected from $(M_2O_3PCH_2)_2NCH_2CH_2CH_2N(CH_2PO_3M_2)CH_2CH_2N(CH_2PO_3M_2)CH_2CH_2CH_2N$—$(CH_2PO_3M_2)_2$, the amount of the mixture on an active acid basis is about 10 ppm to about 500 ppm, preferably about 30 ppm to about 150 ppm, based on the weight of black liquor recovered from the digester. When the first phosphonate is $(M_2O_3PCH_2)_2NCH_2CH_2N(CH_2PO_3M_2)CH_2CH_2N(CH_2PO_3M_2)_2$, the amount of the mixture on an active acid basis is about 30 ppm to about 1000 ppm, preferably about 50 ppm to about 200 ppm, based on the weight of black liquor recovered from the digester.

The most preferred blends of at least one phosphonate of formula (I) and at least one phosphonate of formula (II) are blends of $(M_2O_3PCH_2)_2NCH_2CH_2CH_2N(CH_2PO_3M_2)CH_2CH_2N(CH_2PO_3M_2)CH_2CH_2CH_2N$—$(CH_2PO_3M_2)_2$ and $CH_3C(OH)(PO_3M_2)_2$.

A second embodiment of the invention relates to a method for inhibiting calcium salt scale formation in alkaline chemical pulping processes comprising adding an effective scale inhibiting amount of at least one phosphonate to the black liquor of the chemical pulping process, the composition comprising at least one phosphonate selected from compounds having the formula:

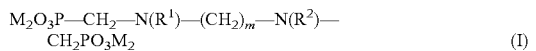
$$M_2O_3P\text{—}CH_2\text{—}N(R^1)\text{—}(CH_2)_m\text{—}N(R^2)\text{—}CH_2PO_3M_2 \quad (I)$$

compounds having the formula:

$$R^3\text{—}C(OH)(PO_3M_2)_2 \quad (II),$$

compounds having the formula:

$$N\text{—}(CH_2PO_3M_2)_3 \quad (III),$$

phosphonates having the formula:

$$\begin{array}{c} CH_2\text{—}COOM \\ | \\ M_2O_3P\text{—}C\text{—}COOM \\ | \\ CH_2CH_2\text{—}COOM, \end{array} \quad (IV)$$

amine oxides of phosphonates of formulas (I) and (III), or mixtures thereof; wherein M is independently selected from hydrogen, alkali metal, alkaline earth metal or ammonium, $R^1$ and $R^2$ are independently selected from —$CH_2PO_3M_2$ or —$(CH_2)_n$—$N$—$(CH_2PO_3M_2)_2$, m is 2 or 3, n is 2 or 3, and $R^3$ is an alkyl group having 1 to 17 carbon atoms and $R^3$ is optionally branched and optionally unsaturated; with the provisos that:

(a) the phosphonate is not a blend of a phosphonate of formula (II) with a phosphonate of formula (III), (b) the phosphonate is not a blend of a phosphonate of formula (II) with a phosphonate of the formula $(M_2O_3P$—$CH_2)_2$—$N$—$(CH_2)_2$—$N$—$(CH_2PO_3M_2)_2$, (c) when the phosphonate is selected from phosphonates of formula (III), phosphonates of the formula $(M_2O_3P$—$CH_2)_2$—$N$—$(CH_2)_2$—$N$—$(CH_2PO_3M_2)_2$, or phosphonates of the formula $(M_2O_3P$—$CH_2)_2$—$N$—$(CH_2)_2$—$N$—$(CH_2PO_3M_2)$—$(CH_2)_2$—$N$—$(CH_2PO_3M_2)_2$, the scale inhibiting composition does not contain a nonionic surfactant, (d) when the phosphonate is selected from phosphonates of formula (III), or phosphonates of the formula $(M_2O_3P$—$CH_2)_2$—$N$—$(CH_2)_2$—$N$—$(CH_2PO_3M_2)$—$(CH_2)_2$—$N$—$(CH_2PO_3M_2)_2$, the amount of the phosphonate on an active acid basis is greater than 25 ppm based on the weight of black liquor recovered from the digester, and (e) when the phosphonate is selected from the phosphonates of formula (IV), the amount of the phosphonate on an active acid basis is greater than 20 ppm based on the weight of black liquor recovered from the digester.

In the practice of the method of this invention in a chemical pulping process, e.g. a Kraft process, the aqueous phosphonate composition of the invention is admixed with the black liquor recovered from the digester. The aqueous phosphonate composition of the invention can be added to the black liquor using any conventional means known to those of ordinary skill in the art. In addition, the aqueous phosphonate composition of the invention can be added directly to the black liquor prior to the black liquor recovery stage, i.e. prior to the black liquor evaporator, or it can be added to the black liquor during the black liquor recovery stage, e.g. between effects of the MEE. A typical temperature range in the black liquor evaporator is generally in the range of about 80 to about 180° C., depending on the effect. The pH of the black liquor in an alkaline chemical pulping process is at least 9. In the case of a Kraft process, the pH of the black liquor is typically about 10 to about 14, and more typically about 12 to about 14. The aqueous phosphonate composition of the invention can be added to the black liquor in any conventional manner known to one of ordinary skill in the art. For example, in a batch digester operation, the addition of the aqueous phosphonate composition of the invention can be a bulk addition at the beginning of the black liquor recovery stage or during the black liquor evaporator cycle, or it can be added in multiple charges throughout the black liquor evaporator cycle, or continuously as the black liquor is recovered. It is currently preferred to add the aqueous phosphonate composition of the invention as a bulk charge at or near the beginning of the black liquor evaporator cycle. In the case of a continuous digester operation, the aqueous phosphonate composition of the invention can be added continuously to the black liquor to maintain the effective concentration of phosphonate in the black liquor or, if the black liquor is held in a storage vessel prior to the black liquor evaporator stage, it can be added as described above.

The amount of a scale inhibiting composition of this invention employed is an effective amount which is that amount that is sufficient to provide an effective scale inhibiting concentration of phosphonate in the black liquor evaporator over time at which the formation, deposition and adherence of calcium salt scale, particularly calcium carbonate or calcium sulfate scale, is satisfactorily inhibited in the black liquor recovery area, and additionally in the digester and/or brown stock washers. One of ordinary skill in the art using this invention will know the acceptable level of calcium salt scale in the digester, brown stock washing area, and black liquor recovery area of the particular chemical pulping facility, and will be able to readily select an appropriate phosphonate and concentration for addition to the black liquor to achieve the desired scale inhibition for the required time based on the disclosure of this specification. It will be apparent to those of skill in the art after reading this specification that many factors of the type which have been mentioned herein and others, will determine the amount of the phosphonate of the invention needed to achieve the desired inhibition. The determination of these amounts is within the ordinary skill of the artisan in this field without undue experimentation considering the direction provided herein.

A third embodiment of the invention relates to a method for inhibiting calcium salt scale formation in an aqueous system in a selected alkaline chemical pulping process comprising (a) determining the calcium salt scale inhibition profiles of phosphonate concentration and process temperature as a function of time for phosphonate compositions admixed with the black liquor composition recovered from the digester of the chemical pulping process, (b) identifying the calcium salt scale inhibition capability required by the selected chemical pulping process based on the process operating conditions of time, temperature and pressure, and the black liquor composition, (c) selecting the appropriate phosphonate composition and phosphonate use concentration to effectively inhibit calcium salt scale formation in the selected chemical pulping process when the phosphonate is admixed with the black liquor composition recovered from the digester of the selected alkaline chemical pulping process based on steps (a) and (b), and (d) admixing the selected phosphonate composition with the black liquor composition in the selected alkaline chemical pulping process during the black liquor recovery stage of the chemical pulping process; wherein the selected phosphonate composition is as defined above for this invention.

A fourth embodiment of the invention relates to a method for inhibiting calcium salt scale formation in an aqueous system in a selected alkaline chemical pulping process comprising (a) identifying the calcium salt scale inhibition capability required by the selected chemical pulping process based on the process operating conditions of time, temperature and pressure, and the black liquor composition, (b) selecting the appropriate phosphonate composition and phosphonate use concentration to effectively inhibit calcium salt scale formation in the selected alkaline chemical pulping process when the phosphonate is admixed with the black liquor composition recovered from the digester in the selected alkaline chemical pulping process based on step (a) and the calcium salt scale inhibition profiles of phosphonate concentration and process temperature as a function of time for phosphonate compositions admixed with the black liquor composition recovered from the digester in a chemical pulping process, and (c) admixing the selected phosphonate composition with the black liquor composition recovered from the digester in the selected alkaline chemical pulping process during the digestion stage of the chemical pulping process; wherein the selected phosphonate composition is as defined above for this invention.

In the third and fourth embodiments of the invention, the calcium salt scale inhibition profiles of phosphonate concentration and process temperature as a function of time for phosphonate compositions admixed with the black liquor composition recovered from the chemical pulping process digester can be determined by conducting laboratory experiments, such as described herein, or by conducting larger scale testing. As each chemical pulping process will vary depending on the type of wood being processed, the specific operating conditions used, the black liquor composition, the composition in the digester, and the like, the specific phosphonate or phosphonate blend and the required use concentration of same necessary to achieve the desired scale inhibition will be dependent upon the specific chemical pulping process. By utilizing the calcium salt scale inhibition profiles in conjunction with the calcium salt scale inhibition capability required by the selected chemical pulping process based on its process operating conditions of time, temperature and pressure, the black liquor composition, and the aqueous digester composition, one of ordinary skill in the art may select the appropriate phosphonate composition and phosphonate use concentration to effectively inhibit calcium salt scale formation in the selected chemical pulping process when the phosphonate is admixed with the black liquor composition in the selected chemical pulping process.

The invention is further described in the following Examples which are not intended to limit or restrict the invention. Unless otherwise indicated all quantities and percents are expressed in weight.

EXAMPLES

A calcium salt scale test of black liquor obtained from a Kraft pulp mill in the upper mid-western United States was employed in the following examples which follow and illustrate the use of the compositions of this invention in the process of this invention. In carrying out these tests, samples were taken of a composition of the black liquor at selected times during the test. The concentration of total calcium and inhibited calcium were determined analytically using Atomic Absorption Spectroscopy (AA). Inhibited calcium is the amount of calcium able to pass through a 0.45 µm filter. The general procedure described below was followed. Additionally, the tests were generally carried out at the selected inhibitor level of 100 parts per million (ppm) active acid based on the amount of black liquor, for each phosphonate composition tested, and without inhibitor present.

Black Liquor Test

The Black Liquor Test used herein was developed to gauge the performance of calcium salt scale inhibition of compositions of this invention in a black liquor composition. The black liquor composition temperature was ramped from ambient temperature to 150° C. in about 45 minutes to one hour and then maintained at 150° C. for an additional one to two hours. Samples were taken from the condenser line of the Parr Bomb Reactor using a liquid cooled extractor at various time intervals under pressure and temperature during the test to monitor calcium concentrations using a procedure for determination of atomic absorption outlined below.

Procedure for Charging the Parr Bomb Reactor and Test Conditions

A weak black liquor sample (about 15 wt. % solids) was taken from a sample point prior to the black liquor evaporators in the Kraft process described above.

The charge of phosphonate employed is on an active acid basis based upon the weight of black liquor charged to the Parr Bomb Reactor. As used herein, the level on an active acid basis is the amount (ppm) of pure free acid that is the molar equivalent of the actual dose of the specific phosphonate(s) used.

Preparation of Black Liquor Sample

Approximately 1.5 L of the weak black liquor obtained above was transferred to a 2 L volumetric flask.

In the control run, no inhibitor was added to the black liquor. In the inventive runs, enough inhibitor was added to the contents of the flask to reach the desired concentration in 2 L, and weak black liquor was added to fill to the 2 L mark.

Charge of the Parr Bomb Reactor and Monitoring of Calcium Release Test

Black liquor was prepared according to the above procedure.

Prior to running each test, the Parr Bomb Reactor was acid cleaned using a 10% sulfuric acid solution to remove any existing deposits. After the acid cleaning, the digester was rinsed with deionized water.

Black liquor with or without inhibitor (1.5 L) was transferred to the Parr Bomb Reactor (2 L) and the initial temperature recorded. The extractor line was purged with nitrogen and a 5 mL sample was taken for AA analysis. The heating sequence was initiated and time recorded as t=0. The heating sequence was to heat the contents of the Parr Bomb Reactor from room temperature to 150° C. in 1 hour and to hold at 150° C. for the remainder of the test (approx. 1-2 hours).

(The AA analysis is done by atomic absorption by flame photometry using a Perkin-Elmer Model 100 spectrometer; see generally, Instrumental Methods of Analysis, Hobart H. Willard, Lynn L. Merritt, Jr.; John A Dean, 4' Edition, D. Van Nostrand Company, Inc. August 1965).

Quantitatively one milliliter (mL) of the sample was transferred to a centrifuge tube with 5 mL of 4% HCl solution and AA was used to determine the calcium content of the sample, i.e. Total Calcium. The remaining sample was drawn into a 10 mL syringe and filtered through a 0.45-μm syringe filter. Quantitatively one mL of the filtrate was transferred to a centrifuge tube with 5 mL of 4% HCl solution and AA was used to determine the calcium content of the filtrate, i.e. Inhibited Calcium.

Every 10 minutes for the length of the test, e.g. approximately 2-3 hours, the liquor in the condenser line was purged, a temperature measurement was made, and approx. a 5 mL liquor sample was pulled. The AA analysis procedure as described above was then repeated. At the end of the test, the calcium content and temperature data were plotted versus time.

Each example below was carried out according to the general procedure recited above. All levels are given in parts per million phosphonate on an active acid basis by weight of black liquor.

The phosphonates used in the examples were obtained from Solutia Inc. (St. Louis, Mo.). Except as specified herein, chemicals used in the examples were obtained from Fisher Scientific.

Tables 3-7 hereinafter following provide the data for a series of test runs performed on the black liquor using various phosphonates. The phosphonate tested is identified by product name (as defined in Tables 1 and 2 herein) in the header of each Table below. The temperature is in degrees Celsius. Parts per million (ppm) of calcium is in parts per million by weight based on the liquor.

Example 1

A black liquor sample with no inhibitor added (Control) was tested in the test described in the Examples section. The results are given in Table 3 below.

TABLE 3

Control - No Inhibitor

| Time, Minutes | Total Calcium, ppm | Inhibited Calcium, ppm | Temp., ° C. |
|---|---|---|---|
| 0 | 34.4 | 28 | 19 |
| 10 | 34.6 | 27 | 23 |
| 20 | 35 | 28.1 | 55 |
| 30 | 36.3 | 27.7 | 78 |
| 40 | 33.7 | 28.6 | 99 |
| 50 | 35.6 | 28.4 | 121 |
| 60 | 34.1 | 21.7 | 140 |
| 75 | 32 | 4.5 | 151 |
| 90 | 30.8 | 2.6 | 150 |
| 105 | 31.5 | 1.6 | 150 |
| 120 | 29.8 | 0.6 | 150 |

Example 2

Dequest 2006 was tested in the test described in the Examples section at 100 ppm active acid. The results are given in Table 4 below.

TABLE 4

100 ppm Dequest 2006

| Time, Minutes | Total Calcium, ppm | Inhibited Calcium, ppm | Temp., ° C. |
|---|---|---|---|
| 0 | 25 | 22.6 | 19 |
| 30 | 25.2 | 24.5 | 103 |
| 40 | 25.1 | 23.6 | 134 |
| 50 | 26.3 | 22.5 | 150 |
| 60 | 26.3 | 22.8 | 150 |
| 70 | 26.3 | 22.1 | 150 |
| 80 | 26.2 | 19.7 | 150 |
| 90 | 26.3 | 18.2 | 150 |
| 105 | 26.2 | 12.6 | 150 |
| 120 | 23.6 | 8.6 | 150 |

The data of this example demonstrates that a use level of 100 ppm provided significant improvement in calcium inhibition compared to no inhibitor. The data of this example suggests that Dequest 2000 and Dequest 2006 would be effective to inhibit calcium salt scale according to the invention.

Example 3

Dequest 2016 was tested in the test described in the Examples section at 100 ppm active acid. The results are given in Table 5 below.

TABLE 5

100 ppm Dequest 2016

| Time, Minutes | Total Calcium, ppm | Inhibited Calcium, ppm | Temp., ° C. |
|---|---|---|---|
| 0 | 34.2 | 28.9 | 20 |
| 10 | 34.9 | 27.5 | 37 |
| 20 | 34.7 | 29.2 | 79 |
| 30 | 36.8 | 27.7 | 120 |

TABLE 5-continued

100 ppm Dequest 2016

| Time, Minutes | Total Calcium, ppm | Inhibited Calcium, ppm | Temp., ° C. |
|---|---|---|---|
| 40 | 36.2 | 28.6 | 148 |
| 50 | 37.2 | 26.3 | 150 |
| 60 | 35.5 | 25.4 | 149 |
| 70 | 36 | 25.4 | 150 |
| 80 | 34.4 | 25.6 | 150 |
| 90 | 34.9 | 24.4 | 150 |
| 105 | 36.2 | 23.6 | 150 |
| 120 | 33.9 | 22.9 | 150 |

The data of this example demonstrates that a use level of 100 ppm provided significant improvement in calcium inhibition compared to no inhibitor. The data of this example suggests that Dequest 2010 and Dequest 2016 would be effective to inhibit calcium salt scale according to the invention.

Example 4

Dequest 2066 was tested in the test described in the Examples section at 10 ppm and 100 ppm active acid. The results are given in Tables 6 and 7 below.

TABLE 6

100 ppm Dequest 2066

| Time, Minutes | Total Calcium, ppm | Inhibited Calcium, ppm | Temp., ° C. |
|---|---|---|---|
| 0 | 25.7 | 25.8 | 19 |
| 10 | 26.2 | 25.9 | 31 |
| 20 | 27.1 | 26.1 | 69 |
| 30 | 26.3 | 25.2 | 112 |
| 40 | 26.9 | 22.4 | 134 |
| 50 | 24.5 | 23 | 150 |
| 60 | 26 | 22.7 | 150 |
| 70 | 26.9 | 23.1 | 150 |
| 80 | 27.1 | 23.5 | 150 |
| 90 | 23.5 | 22.5 | 150 |
| 105 | 26.1 | 23.1 | 150 |
| 120 | 26 | 22.8 | 150 |

TABLE 7

10 ppm Dequest 2066

| Time, Minutes | Total Calcium, ppm | Inhibited Calcium, ppm | Temp., ° C. |
|---|---|---|---|
| 0 | 22.5 | 21.5 | 49 |
| 15 | 23.1 | 21.3 | 101 |
| 30 | 23 | 21.5 | 132 |
| 40 | 23.5 | 22.1 | 150 |
| 50 | 23.3 | 21.2 | 150 |
| 60 | 22.9 | 18.5 | 150 |
| 70 | 22.9 | 14.4 | 150 |
| 80 | 23.2 | 9.4 | 150 |
| 90 | 22.8 | 6.5 | 150 |
| 105 | 23.2 | 4.2 | 150 |
| 120 | 22.4 | 2.8 | 150 |

The data of this example demonstrates that a use level of 100 ppm provided significant improvement in calcium-inhibition compared to the use of no inhibitor or 10 ppm inhibitor. The data of this example suggests that a use level of about 40 ppm to about 500 ppm for Dequest 2060 and Dequest 2066 would be effective to inhibit calcium salt scale according to the invention.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims. It is further intended that each and every claim limitation be literally construed to include any and all variants which are insubstantially different from what is literally recited except variants which are in the prior art.

What is claimed is:

1. A method for inhibiting calcium salt scale formation in alkaline chemical pulping processes comprising adding an effective scale inhibiting amount of at least one phosphonate to a black liquor of said chemical pulping process, said composition comprising at least one phosphonate selected from compounds having the formula:

$$M_2O_3P-CH_2-N(R^1)-(CH_2)_m-N(R^2)-CH_2PO_3M_2 \quad (I),$$

compounds having the formula:

$$R^3-C(OH)(PO_3M_2)_2 \quad (II),$$

compounds having the formula:

$$N-(CH_2PO_3M_2)_3 \quad (III),$$

phosphonates having the formula:

$$\begin{array}{c} CH_2-COOM \\ | \\ M_2O_3P-C-COOM, \\ | \\ CH_2CH_2-COOM \end{array} \quad (IV)$$

amine oxides of phosphonates of formulas (I) and (III), or mixtures thereof;

wherein M is independently selected from hydrogen, alkali metal, alkaline earth metal or ammonium, $R^1$ and $R^2$ are independently selected from $-CH_2PO_3M_2$ or $-(CH_2)_n-N-(CH_2PO_3M_2)_2$, m is 2 or 3, n is 2 or 3, and $R^3$ is an alkyl group having 1 to 17 carbon atoms and $R^3$ is optionally branched and optionally unsaturated; with the provisos that:

(a) said phosphonate is not a blend of a phosphonate of formula (II) with a phosphonate of formula (III), (b) said phosphonate is not a blend of a phosphonate of formula (II) with a phosphonate of the formula $(M_2O_3P-CH_2)_2-N-(CH_2)_2-N-(CH_2PO_3M_2)_2$, (c) when said phosphonate is selected from phosphonates of formula (III), phosphonates of the formula $(M_2O_3P-CH_2)_2-N-(CH_2)_2-N-(CH_2PO_3M_2)_2$, or phosphonates of the formula $(M_2O_3P-CH_2)_2-N-(CH_2)_2-N-(CH_2PO_3M_2)-(CH_2)_2-N-(CH_2PO_3M_2)_2$, said scale inhibiting composition does not contain a nonionic surfactant, (d) when said phosphonate is selected from phosphonates of formula (III), or phosphonates of the formula $(M_2O_3P-CH_2)_2-N-(CH_2)_2-N-(CH_2PO_3M_2)-(CH_2)_2-N-(CH_2PO_3M_2)_2$, the amount of said phosphonate on an active acid basis is greater than 25 ppm based on the weight of black liquor recovered from the digester, and (e) when the phosphonate is selected from the phosphonates of formula (IV), the amount of the phosphonate on an active acid basis is greater than 20 ppm based on the weight of black liquor recovered from the digester.

2. The method of claim 1 wherein M is sodium or potassium when M is an alkali metal.

3. The method of claim 1 wherein $R^1$ and $R^2$ are $CH_2PO_3M_2$.

4. The method of claim 3 wherein m is 2.

5. The method of claim 1 wherein $R^1$ and $R^2$ are $(CH_2)_n$—N—$(CH_2PO_3M_2)_2$.

6. The method of claim 5 wherein m is 2 and n is 3.

7. The method of claim 1 wherein $R^1$ is $CH_2PO_3M_2$, and $R^2$ is $(CH_2)_n$—N—$(CH_2PO_3M_2)_2$.

8. The method of claim 7 wherein m is 2 and n is 2.

9. The method of claim 1 wherein $R^3$ is an alkyl group having 1 to 5 carbon atoms.

10. The method of claim 1 wherein $R^3$ is methyl.

11. The method of claim 1 wherein said phosphonate is at least one phosphonate of formula (I).

12. The method of claim 11 wherein said phosphonate is $(M_2O_3PCH_2)_2NCH_2CH_2N(CH_2PO_3M_2)_2$ and the amount of said phosphonate on an active acid basis is about 10 ppm to about 1000 ppm based on the weight of black liquor recovered from said digester.

13. The method of claim 11 wherein said phosphonate is $(M_2O_3PCH_2)_2NCH_2CH_2N(CH_2PO_3M_2)CH_2CH_2N(CH_2PO_3M_2)_2$ and the amount of said phosphonate on an active acid basis is about 30 ppm to about 1000 ppm based on the weight of black liquor recovered from said digester.

14. The method of claim 11 wherein said phosphonate is $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$, and the amount of said phosphonate on an active acid basis is about 10 ppm to about 1000 ppm based on the weight of black liquor recovered from said digester.

15. The method of claim 1 wherein said phosphonate is at least one phosphonate of formula (II).

16. The method of claim 15 wherein said phosphonate is $CH_3C(OH)(PO_3M_2)_2$ and the amount of said phosphonate on an active acid basis is about 20 ppm to about 200 ppm based on the weight of black liquor recovered from said digester.

17. The method of claim 1 wherein said phosphonate is at least one phosphonate of formula (III).

18. The method of claim 17 wherein said phosphonate is $N(CH_2PO_3M_2)_3$ and the amount of said phosphonate on an active acid basis is about 50 ppm to about 1000 ppm based on the weight of black liquor recovered from said digester.

19. The method of claim 1 wherein said phosphonate is at least one phosphonate of formula (IV).

20. The method of claim 19 wherein said phosphonate is

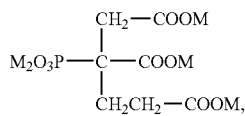

and the amount of said phosphonate on an active acid basis is about 50 ppm to about 500 ppm based on the weight of black liquor recovered from said digester.

21. The method of claim 1 wherein said phosphonate is at least one amine oxide of phosphonates of formulas (I) and (III).

22. The method of claim 1 wherein said phosphonate is a mixture of at least two phosphonates of formula (I).

23. The method of claim 22 wherein said phosphonate is a mixture of: $(M_2O_3PCH_2)_2NCH_2CH_2CH_2N(CH_2PO_3M_2)$ $CH_2CH_2N(CH_2PO_3M_2)CH_2CH_2CH_2N(CH_2PO_3M_2)_2$, and a second phosphonate selected from $N(CH_2PO_3M_2)_3$, $(M_2O_3PCH_2)_2NCH_2CH_2N(CH_2PO_3M_2)_2$, or $(M_2O_3PCH_2)_2NCH_2CH_2N(CH_2PO_3M_2)CH_2CH_2N(CH_2PO_3M_2)_2$.

24. The method of claim 23 wherein said second phosphonate is $N(CH_2PO_3M_2)_3$, and the amount of said mixture on an active acid basis is about 10 ppm to about 1000 ppm based on the weight of black liquor recovered from said digester.

25. The method of claim 23 wherein said second phosphonate is $(M_2O_3PCH_2)_2NCH_2CH_2N(CH_2PO_3M_2)_2$, and the amount of said mixture on an active acid basis is about 20 ppm to about 1000 ppm based on the weight of black liquor recovered from said digester.

26. The method of claim 23 wherein said second phosphonate is $(M_2O_3PCH_2)_2NCH_2CH_2N(CH_2PO_3M_2)$ $CH_2CH_2N(CH_2PO_3M_2)_2$, and the amount of said mixture on an active acid basis is about 10 ppm to about 1000 ppm based on the weight of black liquor recovered from said digester.

27. The method of claim 22 wherein said phosphonate is a mixture of $(M_2O_3PCH_2)_2NCH_2CH_2N(CH_2PO_3M_2)_2$ and $N(CH_2PO_3M_2)_3$, and the amount of said fixture an active acid basis is about 30 ppm to about 1000 ppm based on the weight of black liquor recovered from said digester.

28. The method of claim 22 wherein said phosphonate is a mixture of $(M_2O_3PCH_2)_2NCH_2CH_2N(CH_2PO_3M_2)_2$ and $M_2O_3PCH_2)_2NCH_2CH_2N(CH_2PO_3M_2)CH_2CH_2N(CH_2PO_3M_2)_2$, and the amount of said mixture on an active acid basis is about 20 ppm to about 1000 ppm based on the weight of black liquor recovered from said digester.

29. The method of claim 1 wherein said phosphonate is a mixture of at least one phosphonate of formula (I) and at least one phosphonate of formula (II).

30. The method of claim 29 wherein said phosphonate is a mixture of $(M_2O_3PCH_2)_2NCH_2CH_2CH_2N(CH_2PO_3M_2)$ $CH_2CH_2N(CH_2PO_3M_2)CH_2CH_2CH_2N$—$(CH_2PO_3M_2)_2$, and $CH_3C(OH)(PO_3M_2)_2$, and the amount of said mixture on an active acid basis is about 10 ppm to about 500 ppm based on the weight of black liquor recovered from said digester.

31. The method of claim 29 wherein said phosphonate is a mixture of $(M_2O_3PCH_2)_2NCH_2CH_2N(CH_2PO_3M_2)$ $CH_2CH_2N(CH_2PO_3M_2)_2$ and $CH_3C(OH)(PO_3M_2)_2$, and the amount of said mixture on an active acid basis is about 30 ppm to about 1000 ppm based on the weight of black liquor recovered from said digester.

32. The method of claim 1 wherein said phosphonate is a mixture of at least one phosphonate of formula (I) and at least one phosphonate of formula (III).

33. The method of claim 32 wherein said phosphonate is a mixture of $(M_2O_3PCH_2)_2NCH_2CH_2N(CH_2PO_3M_2)$ $CH_2CH_2N(CH_2PO_3M_2)_2$ and a second phosphonate selected from $N(CH_2PO_3M_2)_3$, and the amount of said mixture on an active acid basis is about 50 ppm to about 1000 ppm based on the weight of black liquor recovered from said digester.

34. The method of claim 1 wherein said phosphonate is a mixture of at least two phosphonates of formula (II).

35. The method of claim 1 wherein said phosphonate is a mixture of at least one phosphonate of formula (IV) and at least one phosphonate of formula (I), formula (II) or formula (III).

36. The method of claim 1 wherein said chemical pulping process is a Kraft process.

37. The method of claim 36 calcium salt scale is inhibited in the digester.

38. The method of claim 37 wherein said calcium salt is calcium carbonate or calcium sulfate.

39. The method of claim 38 said calcium salt is calcium carbonate.

40. The method of claim 36 calcium salt scale is inhibited in the brown stock washing area.

41. The method of claim 36 calcium salt scale is inhibited in the black liquor recovery area.

42. The method of claim 1 wherein the pH of said black liquor is at least 9.

43. A method for inhibiting calcium salt scale formation in an aqueous system in a selected alkaline chemical pulping process comprising:
(a) determining the calcium salt scale inhibition profiles of phosphonate concentration and process temperature as a function of time for phosphonate compositions admixed with a black liquor composition recovered from the digester of said chemical pulping process,
(b) identifying the calcium salt scale inhibition capability required by said selected chemical pulping process based on the process operating conditions of time, temperature and pressure, and the black liquor composition,
(c) selecting the appropriate phosphonate composition and phosphonate use concentration to effectively inhibit calcium salt scale formation in said selected chemical pulping process when said phosphonate is admixed with the black liquor composition recovered from the digester of said selected alkaline chemical pulping process based on steps (a) and (b), and
(d) admixing the selected phosphonate composition with the black liquor composition in said selected alkaline chemical pulping process during the black liquor recovery stage of the chemical pulping process;
wherein said selected phosphonate composition comprises at least one phosphonate selected from compounds having the formula:

$$M_2O_3P-CH_2N(R^1)-(CH_2)_m-N(R^2)-CH_2PO_3M_2 \quad (I),$$

compounds having the formula:

$$R^3-C(OH)(PO_3M_2)_2 \quad (II),$$

compounds having the formula:

$$N-(CH_2PO_3M_2)_3 \quad (III),$$

phosphonates having the formula:

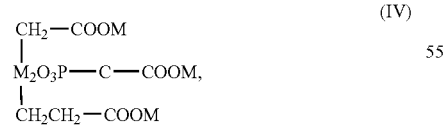

$$\begin{array}{c} CH_2-COOM \\ | \\ M_2O_3P-C-COOM, \\ | \\ CH_2CH_2-COOM \end{array} \quad (IV)$$

amine oxides of phosphonates of formulas (I) and (III), or mixtures thereof; wherein M is independently selected from hydrogen, alkali metal, alkaline earth metal or ammonium, $R^1$ and $R^2$ are independently selected from $-CH_2PO_3M_2$ or $-(CH_2)_n-N-(CH_2PO_3M_2)_2$, m is 2 or 3, n is 2 or 3, and $R^3$ is an alkyl group having 1 to 17 carbon atoms and $R^3$ is optionally branched and optionally unsaturated; with the provisos that:

(i) said phosphonate is not a blend of a phosphonate of formula (II) with a phosphonate of formula (III), (ii) said phosphonate is not a blend of a phosphonate of formula (II) with a phosphonate of the formula $(M_2O_3P-CH_2)_2-N-(CH_2)_2-N-(CH_2PO_3M_2)_2$, (iii) when said phosphonate is selected from phosphonates of formula (III), phosphonates of the formula $(M_2O_3P-CH_2)_2-N-(CH_2)_2-N-(CH_2PO_3M_2)_2$, or phosphonates of the formula $(M_2O_3P-CH_2)_2-N-(CH_2)_2-N-(CH_2PO_3M_2)-(CH_2)_2-N-(CH_2PO_3M_2)_2$, said scale inhibiting composition does not contain a nonionic surfactant, (iv) when said phosphonate is selected from phosphonates of formula (III), phosphonates of the formula $(M_2O_3P-CH_2)_2-N-(CH_2)_2-N-(CH_2PO_3M_2)_2$, or phosphonates of the formula $(M_2O_3P-CH_2)_2-N-(CH_2)_2-N-(CH_2PO_3M_2)-(CH_2)_2-N-(CH_2PO_3M_2)_2$, the amount of said phosphonate on an active acid basis is greater than 25 ppm based on the weight of black liquor recovered from the digester, and (v) when the phosphonate is selected from the phosphonates of formula (IV), the amount of the phosphonate on an active acid basis is greater than 20 ppm based on the weight of black liquor recovered from the digester.

44. A method for inhibiting calcium salt scale formation in an aqueous system in a selected alkaline chemical pulping process comprising:
(a) identifying the calcium salt scale inhibition capability required by said selected chemical pulping process based on the process operating conditions of time, temperature and pressure, and a black liquor composition,
(b) selecting the appropriate phosphonate composition and phosphonate use concentration to effectively inhibit calcium salt scale formation in said selected alkaline chemical pulping process when said phosphonate is admixed with the black liquor composition recovered from the digester in said selected alkaline chemical pulping process based on step (a) and the calcium salt scale inhibition profiles of phosphonate concentration and process temperature as a function of time for phosphonate compositions admixed with the black liquor composition recovered from the digester in a chemical pulping process, and
(c) admixing the selected phosphonate composition with the black liquor composition recovered from the digester in said selected alkaline chemical pulping process during the digestion stage of the chemical pulping process;
wherein said selected phosphonate composition comprises at least one phosphonate selected from compounds having the formula:

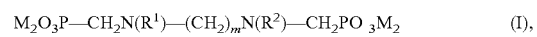

$$M_2O_3P-CH_2N(R^1)-(CH_2)_m N(R^2)-CH_2PO_3M_2 \quad (I),$$

compounds having the formula:

$$R^3-C(OH)(PO_3M_2)_2 \quad (II),$$

compounds having the formula:

$$N-(CH_2PO_3M_2)_3 \quad (III),$$

phosphonates having the formula:

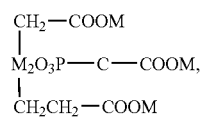 (IV)

amine oxides of phosphonates of formulas (I) and (III), or mixtures thereof;
wherein M is independently selected from hydrogen, alkali metal, alkaline earth metal or ammonium, $R^1$ and $R^2$ are independently selected from $-CH_2PO_3M_2$ or $-(CH_2)_n-N-(CH_2PO_3M_2)_2$, m is 2 or 3, n is 2 or 3, and $R^3$ is an alkyl group having 1 to 17 carbon atoms and $R^3$ is optionally branched and optionally unsaturated; with the provisos that:
  (i) said phosphonate is not a blend of a phosphonate of formula (II) with a phosphonate of formula (III),
  (ii) said phosphonate is not a blend of a phosphonate of formula (II) with a phosphonate of the formula $(M_2O_3P-CH_2)_2-N-(CH_2)_2-N-(CH_2PO_3M_2)_2$,
  (iii) when said phosphonate is selected from phosphonates of formula (III), phosphonates of the formula $(M_2O_3P-CH_2)_2-N-(CH_2)_2-N-(CH_2PO_3M_2)_2$, or phosphonates of the formula $(M_2O_3P-CH_2)_2-N-(CH_2)_2-N-(CH_2PO_3M_2)-(CH_2)_2-N-(CH_2PO_3M_2)_2$, said scale inhibiting composition does not contain a nonionic surfactant,
  (iv) when said phosphonate is selected from phosphonates of formula (III), phosphonates of the formula $(M_2O_3P-CH_2)_2-N-(CH_2)_2-N-(CH_2PO_3M_2)_2$, or phosphonates of the formula $(M_2O_3P-CH_2)_2-N-(CH_2)_2-N-(CH_2PO_3M_2)-(CH_2)_2-N-(CH_2PO_3M_2)_2$, the amount of said phosphonate on an active acid basis is greater than 25 ppm based on the weight of black liquor recovered from the digester, and
  (v) when the phosphonate is selected from the phosphonates of formula (IV), the amount of the phosphonate on an active acid basis is greater than 20 ppm based on the weight of black liquor recovered from the digester.

* * * * *